(12) United States Patent
Higgins

(10) Patent No.: US 6,598,845 B1
(45) Date of Patent: Jul. 29, 2003

(54) CRADLE FOR ELECTRONIC DEVICES

(76) Inventor: Lee Higgins, 4241 East Cholla, Phoenix, AZ (US) 85028

( * ) Notice: Subject to any disclaimer, the term of this patent is extended or adjusted under 35 U.S.C. 154(b) by 0 days.

(21) Appl. No.: 09/934,209

(22) Filed: Aug. 21, 2001

(51) Int. Cl.[7] .................................................. A47F 5/00
(52) U.S. Cl. ............................. 248/309.1; 248/346.03
(58) Field of Search .............................. 248/309.1, 684, 248/346.01, 346.03, 346.04, 346.5

(56) References Cited

U.S. PATENT DOCUMENTS

| | | | | |
|---|---|---|---|---|
| 4,824,059 A | | 4/1989 | Butler | |
| 5,287,244 A | * | 2/1994 | Hileman et al. | 361/687 |
| 5,305,980 A | * | 4/1994 | Le Blanc | 248/309.1 |
| 5,480,115 A | | 1/1996 | Haltof | |
| 5,542,589 A | * | 8/1996 | McKee | 224/275 |
| 5,751,546 A | | 5/1998 | Clark et al. | |
| D417,205 S | | 11/1999 | Clark | |
| 5,996,956 A | | 12/1999 | Shawver | |
| 6,113,050 A | * | 9/2000 | Rush | 248/346.01 |
| 6,128,185 A | * | 10/2000 | Fuhs et al. | 361/683 |

* cited by examiner

*Primary Examiner*—Leslie A. Braun
*Assistant Examiner*—A. Joseph Wujciak, III

(57) ABSTRACT

A cradle for mounting a plurality of electronic devices therein is provided. The cradle comprises a plurality of cavities, each of the plurality of cavities being adapted to releasably mount one or more electronic devices therein.

7 Claims, 6 Drawing Sheets

CRADLE FOR ELECTRONIC DEVICES

TECHNICAL FIELD

This invention relates to cradles for electronic devices, and, more particularly, to cradles for holding two or more electronic devices in electrical communication with one another.

BACKGROUND OF THE INVENTION

Although the prior art shows cradles for electronic devices, none are believed to illustrate the type of device disclosed and claimed. Specifically, businesses which employ non-cash transactions, such transactions including, but not limited to, credit cards, debit cards, pre-pay cards and the like, are generally required to install card swipe devices in combination with printers which are permanently fixed to a given location. The permanent fixation is required to allow electronic communication via a dedicated line with respective card issuers to transmit card transactions to said issuers.

As is well known in the art, card swipe devices read information from magnetic strips located on cards which includes information on the card holder for billing purposes. Printers generally provide original documents of the transaction for the business as well as a copy for the card holder.

The requirement for a permanently affixed location unduly restricts such sales. However, now that affordable portable computing equipment such as the Palm Pilot® device has become readily available, businesses have begun to take advantage of the ability of such devices to record and later transmit transactions. Thus, portable electronic devices were brought into electronic communication with card swipe devices and printers whereby a card transaction could be conducted in a remote location and subsequently transmitted to the issuer at a later time. The Palm Pilot® device does not require a land line but connects to the internet over the air via an antenna.

Such arrangements have found favor in environments such as trade shows and swap meets by avoiding the need to provide a land line and thereby restricting the swipe device by the need for permanent or semi-permanent affixation to that land line. In addition, in a more traditional business setting, the above connection saves costs by negating the need for a dedicated land line to transmit the transaction information. The transactions can be stored on the portable electronic device and later transmitted whenever convenient for the business.

While the electronic communications described above are known in the art, ease of use has been somewhat deficient. The combination of devices can be difficult to carry around as a unit. This requires the user to assemble and disassemble whenever a move is desired. Thus, there is a need for a carrying device which simplifies this moving task. The present invention meets this need.

Some cradle devices are known in the art. U.S. Pat. No. 5,751,546 entitled "Cradle Assembly for Portable Computing Devices and Method" which issued on May 12, 1998 to Clark et al. shows a cradle assembly which supports a portable electronic device and may also include electrical connections to said device.

U.S. Pat. No. 5,996956 entitled "Mounting Platform for an Electronic Device" which issued on Dec. 7, 1999 to Shawver provides a mounting platform for an electronic device, the mounting platform having a stylus for actuating the controls of the device mounted thereon.

None of the references cited disclose the present invention.

SUMMARY OF THE INVENTION

It is an object of this invention to provide cradle for supporting two or more electronic devices in electrical communication with each other.

It is another object of this invention to provide a cradle for supporting a portable electronic device in electrical communication with a card swipe for facilitating credit card transactions.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Figure 1:
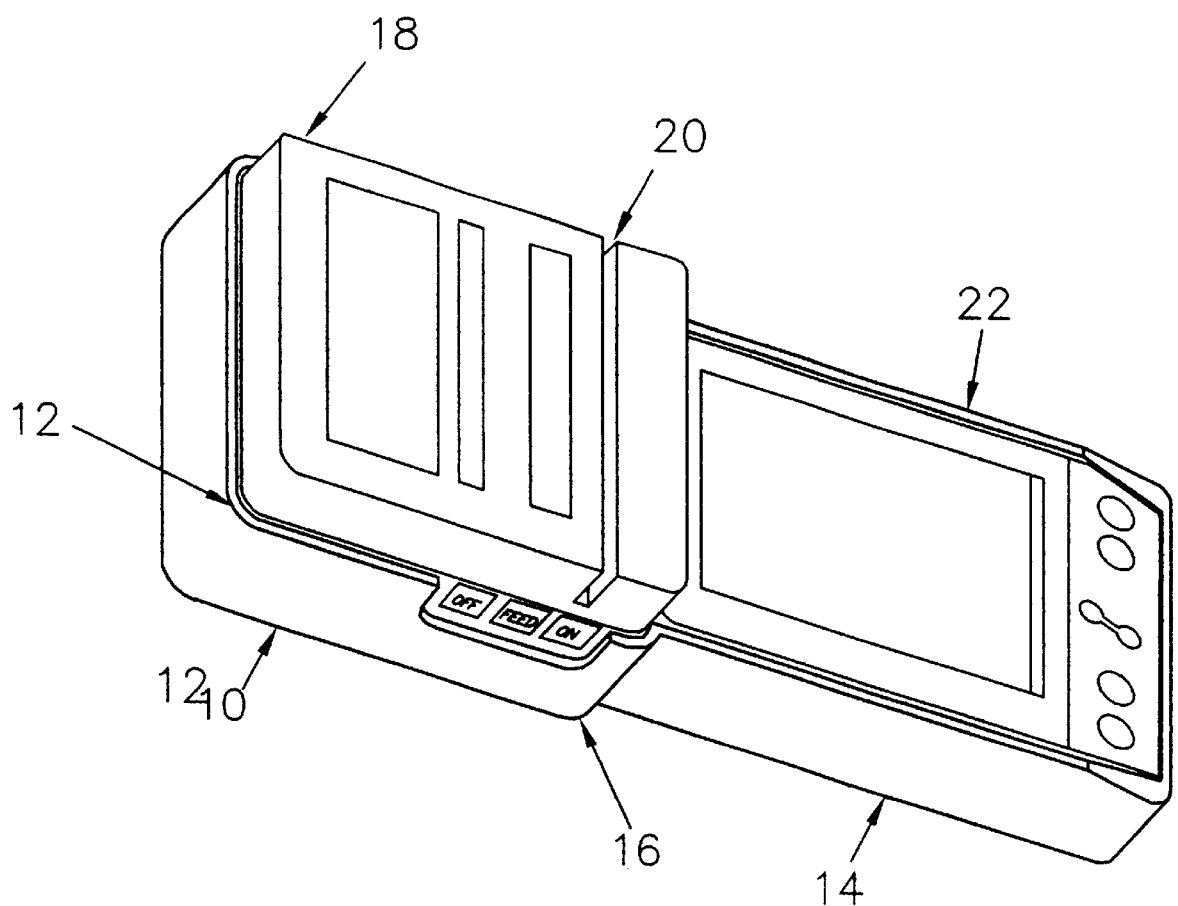
FIG. 1 is a perspective side and top view of a cradle embodying the present invention in use with a portable electronic device, a card swipe and a printer.

Referring more particularly to the drawings by characters of reference, FIGS. 1–6 disclose the presently preferred embodiment of a two cavity version of a cradle device 10 having a first cavity 12 and a second cavity 14 having a common sidewall 16. In this embodiment, both cavities 12 and 14 are generally open top rectangular box-like shapes. Note that the invention is not restricted to the rectangular box like shape of the preferred embodiment, other shapes are certainly within the scope of the present invention.

Figure 2:
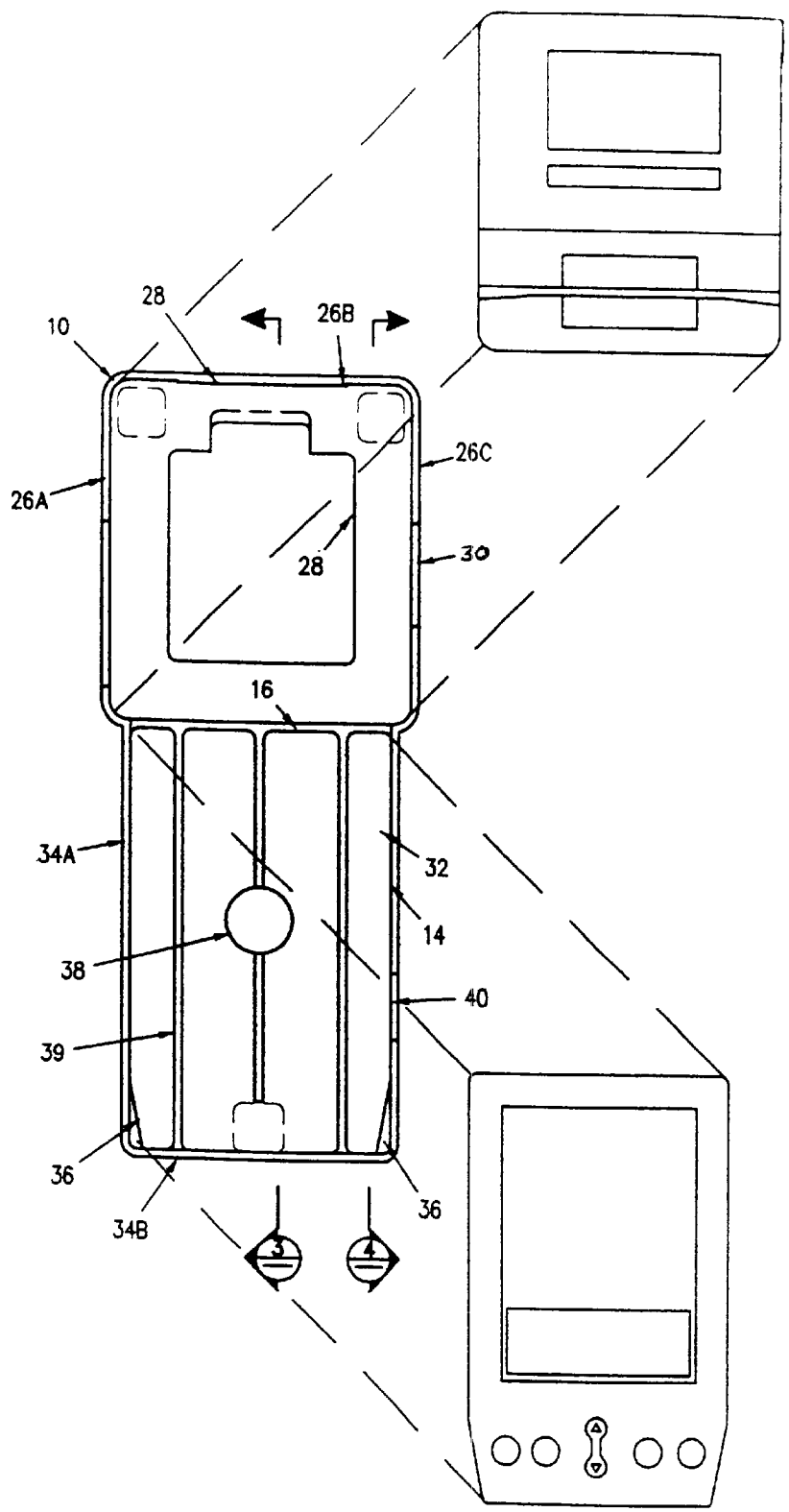
FIG. 2 is a top exploded view of the cradle of FIG. 1.
Figure 3:
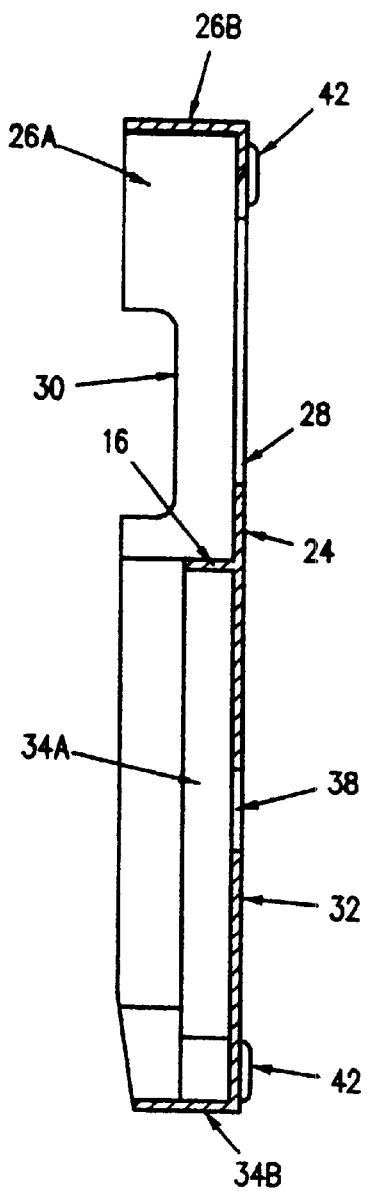
FIG. 3 is a cross sectional view of the embodiment of FIG. 2 taken along line 3—3.
Figure 4:
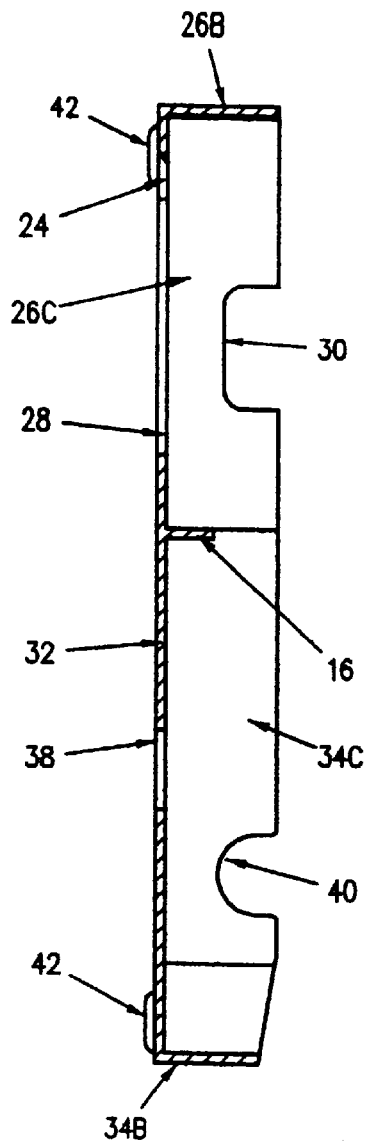
FIG. 4 is a cross sectional view of the embodiment of FIG. 2 taken along line 4—4.

As best seen in FIGS. 1 and 2, first cavity 12 is sized to handle a printer/card swipe 18 combination. The printer and card swipe are usually, as described in this embodiment, provided as integral unit 18 by the card issuer for use by the business. Thus, only first cavity 12 is needed to hold printer/card swipe.

Note that the invention is not restricted to a single cavity 12 holding only printer/card swipe 18 as set forth herein. If desired, separate cavities for a separate printer and a separate card swipe are certainly contemplated and are within the scope of the present invention.

Figure 5:
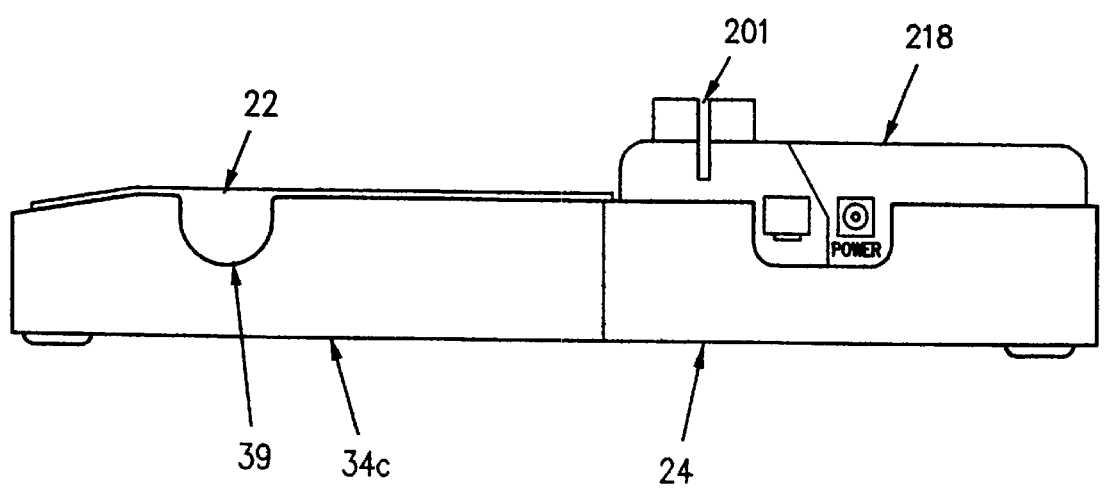
FIG. 5 is a right side view of the embodiment of FIG. 1.
Figure 6:
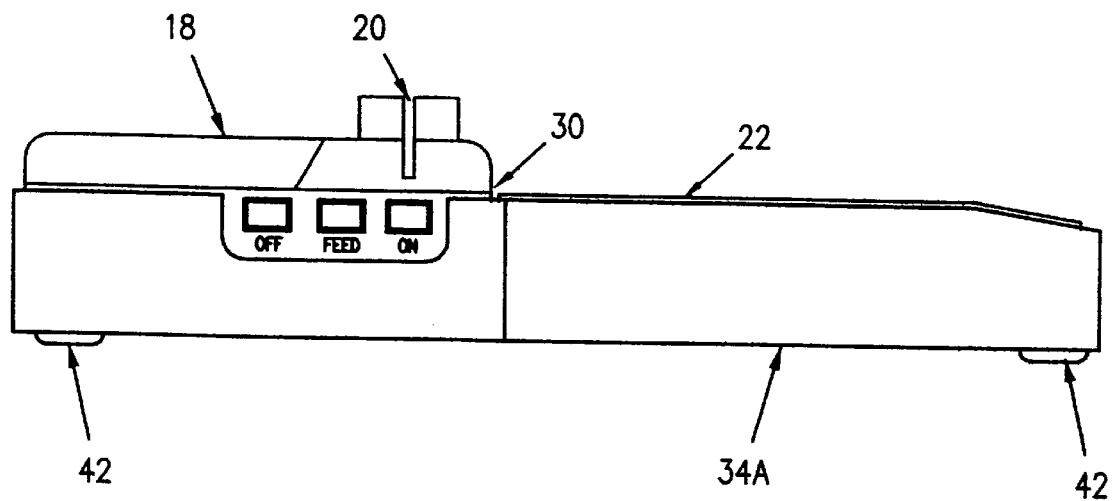
FIG. 6 is a left side view of the embodiment of FIG. 1.

In the presently preferred embodiment, first cavity 12 includes a bottom 24 and three sidewalls 26A, 26B and 26C which, in combination with common sidewall 16, form the rectangular open box shape previously described. An inwardly extending overhang 30 mounted at the top of sidewall 26B releasably engages an edge of printer/card swipe 18 to retain within first cavity 12. As best seen in FIGS. 5 and 6, printer/card swipe 18 extend above sidewalls 26 and common sidewall 16 to allow swiping of the card and easy access to the printer.

Bottom 24 is provided with a rectangular opening 28 centered therein which allows a user access to the bottom of printer/card swipe 18 for easy removal thereof and for access to batteries, connectors and to change the paper. In addition, a plurality of cutouts 30 are provided in sidewalls 26 to allow access to printer/card swipe 18 controls as best seen in FIGS. 3–6.

In the illustrated embodiment, two cutouts 30 are provided, one each in sidewalls 26A and 26C, respectively. However, the position and number of cutouts 30 is a matter of choice relating to the particular equipment employed and is not limited to the exemplary embodiment described herein.

As best seen in FIGS. 1 and 2, second cavity 14 is sized to handle a portable electronic computing device such as a Palm Pilot®.

In the presently preferred embodiment, second cavity 14 includes a bottom 32 and three sidewalls 34A, 34B and 34C which, in combination with common sidewall 16, form the rectangular open box shape previously described. Two inwardly extending overhanging triangles 36 are mounted at the top of and at the junctions of sidewalls 34A-B and 34B-C. Triangles 36 releasably engage the top of portable electronic device 22 to retain within second cavity 14. As best seen in FIGS. 5 and 6, electronic device 22 is about the same height as sidewalls 34.

Bottom 32 is provided with a circular opening 38 centered therein which allows a user access to the bottom of electronic device 22 for easy removal thereof. In addition, a plurality of ribs 39 are provided for strength on bottom 32. Lastly, cutouts 40 are provided in sidewalls 34 to allow access to electronic device 22 controls as best seen in FIGS. 3–6. In the illustrated embodiment, one cutout 40 is provided in sidewall 34C. However, the position and number of cutouts 40 is a matter of choice relating to the particular equipment employed and is not limited to the exemplary embodiment described herein.

Lastly, a tripod of feet 42, two at the corners formed by sidewalls 26A–26B and 26B–26C and one centered a sidewall 34B are optionally provided as cushions for device 10 when resting on a surface.

Although only certain embodiments have been illustrated and described, it will be apparent to those skilled in the art that various changes and modifications may be made therein without departing from the spirit of the invention or from the scope of the appended claims.

What is claimed is:

1. A cradle for mounting a plurality of electronic devices therein, the cradle comprising a first open cavity and a second open cavity, the first and second cavities being connected together by a common sidewall and each cavity being defined by at least three additional walls, one of said walls of the first cavity having an upper edge, which has an overhang extending inwardly there from into said first cavity for securing a printer/card swipe device therein, two of said walls of the second cavity having an upper edge, which has an overhanging triangular member extending inwardly there from into said second open cavity for securing a portable electronic computing device therein, each of said first open cavity and said second open cavity having a base with an opening there through, whereby said printer/card swipe may be accessed or permit ease of removal through its base opening and said portable electronic computing device may be accessed or permit each of removal through its base opening.

2. The cradle of claim 1 wherein both cavities comprise a bottom and three sidewalls, the three sidewalls, in combination with the common sidewall, form the rectangular open box-like shape.

3. The cradle of claim 2 wherein both cavities are adapted to releasably hold the respective electronic devices therewithin.

4. The cradle of claim 2 wherein both cavities are further provided with openings in the bottoms thereof.

5. The cradle of claim 2 wherein the sidewalls of both cavities are provided with one or more cutouts.

6. The cradle of claim 1 further comprising a plurality of feet adapted to allow the cradle to rest on a surface.

7. A cradle for mounting a plurality of electronic devices therein, the cradle comprising a first open cavity and a second open cavity, the first and second cavities being connected together by a common sidewall and each cavity being defined by at least three additional walls, one of said walls of the first cavity having an upper edge, which has an overhang extending inwardly there from into said first cavity for securing a printer/card swipe device therein, two of said walls of the second cavity having an upper edge, which has an overhanging triangular member extending inwardly there from into said second open cavity for securing a portable electronic computing device therein, each of said first open cavity and said second open cavity having a base with an opening there through, whereby said printer/card swipe may be accessed or permit ease of removal through its base opening and said portable electronic computing device may be accessed or permit each of removal through its base opening, wherein both cavities are further provided with openings in the bottoms thereof.

\* \* \* \* \*